(12) United States Patent
Thierwechter

(10) Patent No.: US 9,417,062 B2
(45) Date of Patent: Aug. 16, 2016

(54) FORENSIC MAPPING INSTRUMENT

(71) Applicant: Andrew P. Thierwechter, Lewistown, PA (US)

(72) Inventor: Andrew P. Thierwechter, Lewistown, PA (US)

( * ) Notice: Subject to any disclaimer, the term of this patent is extended or adjusted under 35 U.S.C. 154(b) by 0 days.

(21) Appl. No.: 14/180,984

(22) Filed: Feb. 14, 2014

(65) Prior Publication Data

US 2014/0259710 A1    Sep. 18, 2014

Related U.S. Application Data

(60) Provisional application No. 61/765,298, filed on Feb. 15, 2013.

(51) Int. Cl.
*G01C 15/06* (2006.01)

(52) U.S. Cl.
CPC ..................... *G01C 15/06* (2013.01)

(58) Field of Classification Search
CPC ...... G01C 15/002; G01C 15/06; G01C 15/00; G01C 15/08; G01C 15/02
USPC .................................... 33/295, 293
See application file for complete search history.

(56) References Cited

U.S. PATENT DOCUMENTS

| | | | | |
|---|---|---|---|---|
| 1,227,631 A * | 5/1917 | Kolesch | ................. | G01C 15/06 33/295 |
| 1,256,097 A * | 2/1918 | Bachfield | ............... | G01C 15/06 33/293 |
| 2,663,937 A * | 12/1953 | Fatkin | .................... | G01C 15/10 33/293 |
| 3,172,205 A * | 3/1965 | Gammon | ............... | G01C 15/10 33/295 |
| 3,195,234 A * | 7/1965 | Glidden | ................. | G01C 15/06 33/293 |
| 5,311,222 A * | 5/1994 | Buckley | ................. | G01C 15/02 356/4.01 |
| 5,392,521 A * | 2/1995 | Allen | ..................... | G02B 5/122 33/293 |
| 5,749,549 A * | 5/1998 | Ashjaee | ................. | F16M 11/08 248/168 |
| 6,397,484 B1 * | 6/2002 | Greene | ................. | G01C 15/105 33/392 |
| 6,425,186 B1 * | 7/2002 | Oliver | .................... | G01C 15/02 33/264 |
| 7,215,412 B2 | 5/2007 | O'Loughlin | | |
| 8,230,609 B1 * | 7/2012 | Sanders | ................. | G01C 15/00 33/293 |
| 8,864,327 B2 * | 10/2014 | Gregory | ................. | G01C 15/06 33/275 R |
| 2011/0032509 A1 | 2/2011 | Bridges | | |
| 2012/0272536 A1 * | 11/2012 | Nishita | .................. | G01C 15/06 33/290 |

\* cited by examiner

*Primary Examiner* — Christopher Fulton
(74) *Attorney, Agent, or Firm* — Michael L. Greenberg, Esq.; Greenberg & Lieberman, LLC

(57) ABSTRACT

A device relating to a standalone laser target system which has the capacity to employ gravity to achieve a position plumb with the ground and to be easily operated at night or in low light conditions. The laser target is retro-reflective and is self-plumbing from the target frame. The target frame also has a detachable handle, which is used for positioning the target. The target frame further has an internal power source to illuminate the target. The device is designed to be easily packed in a protective carrying case to facilitate transport of the device.

4 Claims, 25 Drawing Sheets

FORENSIC MAPPING INSTRUMENT

This application is a non-provisional application of provisional patent application No. 61/765,298 filed on Feb. 15, 2013, and priority is claimed thereto.

FIELD OF THE PRESENT INVENTION

The present invention relates to forensic mapping instruments, and more specifically to a standalone laser target system equipped with a suspended target object held plumb by gravity. The present invention is employed by a user, and is capable of reflecting light from a source origin such as a laser or infrared emitter back to the source origin easily in order to provide accurate measurements.

BACKGROUND OF THE PRESENT INVENTION

In the areas of accident investigation, crime investigation, or crash forensics, forensic mapping is a critical tool and procedure for documenting a scene of interest and evidence contained therein. This is done to preserve the scene through forensic documentation for the purpose of determining and verifying the chain of events which occurred at a scene. Conventionally, forensic mapping equipment is used to measure distances and angles at the scene, which typically include equipment similar to that used by a surveying team, such as a Total Station. This device is frequently employed by contractors, construction personnel, and surveyors as well. To those skilled in the art, this is known to be the most commonly used conventional surveying tool, wherein a first person operates the Total Station itself, and a second person, often known as a rod man, holds a rod with a reflector, occasionally referred to as a prism pole or simply 'pole'. The first person with the Total Station is set up on a known reference point, and the second person moves to points of interest, whereby the Total Station may be used to ascertain coordinates, measurements of angles, and distance of and to the position that the rod man stakes out.

Conventionally, the Total Station must establish a level surface through the use of an adjustable tripod or other leveling device in order to facilitate accurate measurements. Additionally, the reflector must be held precisely plumb, or vertically perpendicular to the horizon. This must be done for each and every point of interest, and thus, it is a time consuming process. Frequently, the initial set up of this operation is the most time-consuming portion of the procedure. Occasionally, grass or high brush can interfere with the accuracy of the procedure as well.

Many Total Stations have the ability to operate in two modes, the first being infrared, which requires a prism to reflect an infrared laser beam back to the Total Station in order to take a reading of the shot. The prism is mounted to a pole and held by an assistant (rod man). In order for the shot to be accurate, the prism pole must be held plumb. The other mode of a conventional Total Station is reflectorless, wherein a visible red laser is employed rather than an infrared laser. The visible red laser can be "shot" to any object within range and enough of the light is then reflected back to the total station for a reading to be taken. Some Total Stations are known to operate with only a visible red laser. These Total Stations are equipped with a switch to regulate between two modes: a reflector mode which uses low power, and a reflectorless mode which uses high power.

Unfortunately, it is generally accepted that it is even more difficult to perform this procedure at night without ample exterior ambient lighting. Additionally, it is known to be difficult for the second person to perfectly plumb the prism pole.

Thus, there is a need for a device that can quickly plumb the prism pole commonly employed by a Total Station and that can be adequately employed at night, where ambient lighting is minimal, saving the user's time, and expediting the process.

U.S. Pat. No. 7,215,412(B2) granted to O'Loughlin et al on May 8, 2007 is for "Flagpole Reflectors For Laser Range Finders." While O'Loughlin teaches a prism pole that is similar to the present invention, it does not employ a self-plumbing agent capable of quickly plumbing the target, nor can it easily be adapted for use in low or no ambient light.

U.S. Publication No. US 2011/0032509 A1 published on Feb. 10, 2011 by Bridges is for an 'Absolute Distance Meter With Optical Switch.' Bridges teaches a distance meter designed to measure the distance to a target via an emitted light beam. Bridges varies from the present invention in that Bridges is designed to be a complete system for measuring distance alone, whereas the present invention is configured to facilitate and expedite the use of a conventional Total Station by placing the target of the light beam in a plumb state quickly, and with minimal effort.

SUMMARY OF THE PRESENT INVENTION

The present invention provides a unique and heretofore unutilized target system wherein the laser target is a hanging, weighted pendulum object which is self-plumbing and provides the necessary reflectivity or retro-reflectivity when used with either an infrared or visible laser. The target is suspended from a frame structure which allows for the free movement of the target. The target of the present invention is plumbed by gravity, and can be used on level or sloped surfaces. The present invention is designed to facilitate and expedite the process of Total Station surveying and measurement.

The present invention preferably employs a low target frame designed for low targets or a high target frame, which is employed when a high target is required. In either case, the target frame of the present invention is preferably illuminated via one or more conventional LED lights which are preferably powered via an on-board battery. The illumination of the target enables the present invention to be easily employed quickly and accurately at night or in locations with low ambient lighting.

The target of the present invention may be equipped with a weighted target body to aide in the process of achieving a state of plumb for the target, especially in windy conditions. When the high target frame is employed, the target is preferably configured with a laser plummet.

The laser plummet employed with the high target of the present invention is designed to vertically align the target with the entity to be measured by positioning it using a downward focused laser. A connecting rod is preferably suspended from the target linking the target to the laser plummet. The connecting rod and laser plummet provide sufficient weight to maintain the target in a plumb state even in windy conditions.

DETAILED DESCRIPTION OF THE PREFERRED EMBODIMENT

The present invention is a laser target system for measuring a specific point in space along an X, Y, and Z axis from a predetermined and often arbitrary point of reference, origin, or station. The present invention is designed to be used with conventional electronic optical laser instruments in order to measure distances and angles in combination with an electronic distance measuring instrument (EDMI) and theodolite, utilizing an infrared laser and/or visible red laser. These electric instruments can be Total Stations or other laser measuring devices that are commonly employed in the fields of land surveying, construction, and forensic mapping.

Figure 10:
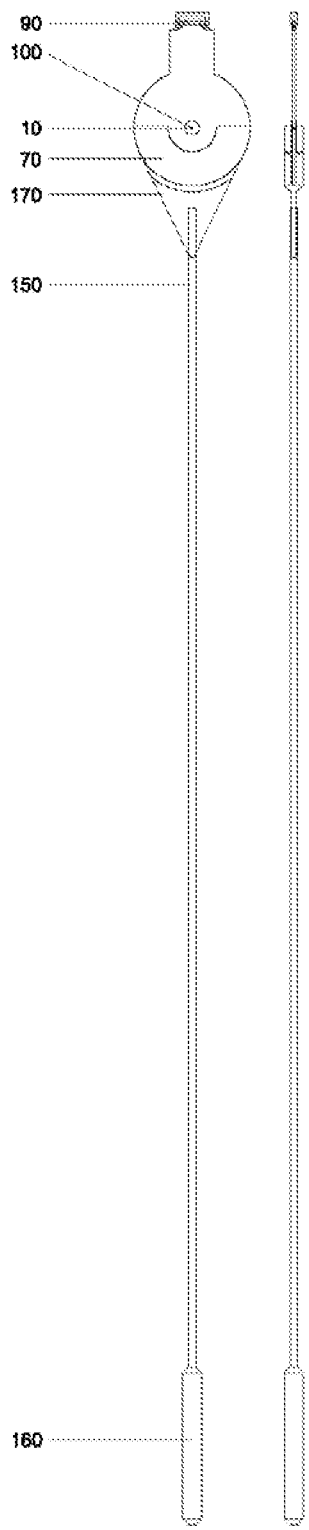
FIG. 10 shows another embodiment of the present invention as seen from the front and side of the target to be used in the high target frame embodiment of the present invention, displaying the dual axial pivot point and highlighting the connecting rod linking the target body to the laser plummet.
Figure 11A:
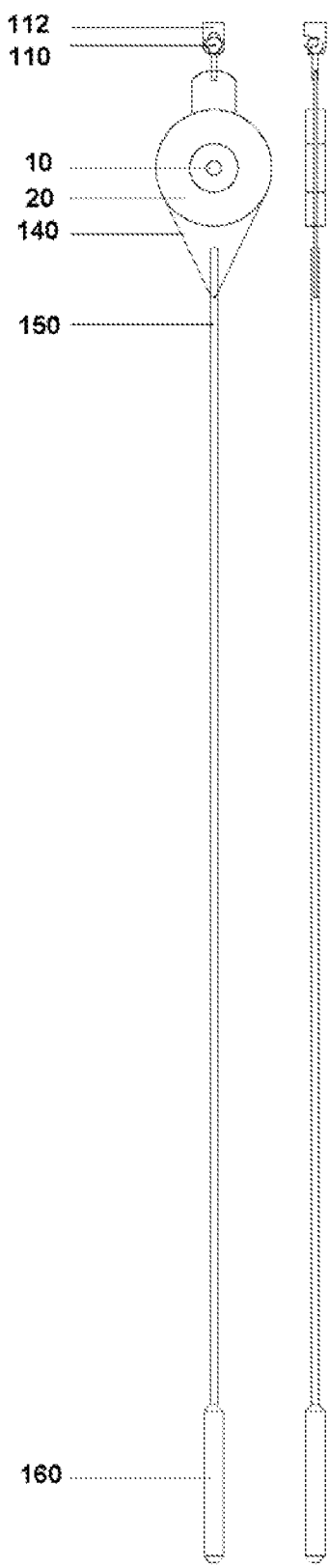
FIG. 11a displays a view of the target of an alternate embodiment of the present invention as seen from the front and the side, highlighting the ball and socket joint pivot point, an integrated stop to limit rotation on the horizontal plane, and target designed to be employed with the high target frame, highlighting the connecting rod linking the target body to the laser plummet.
Figure 11B:
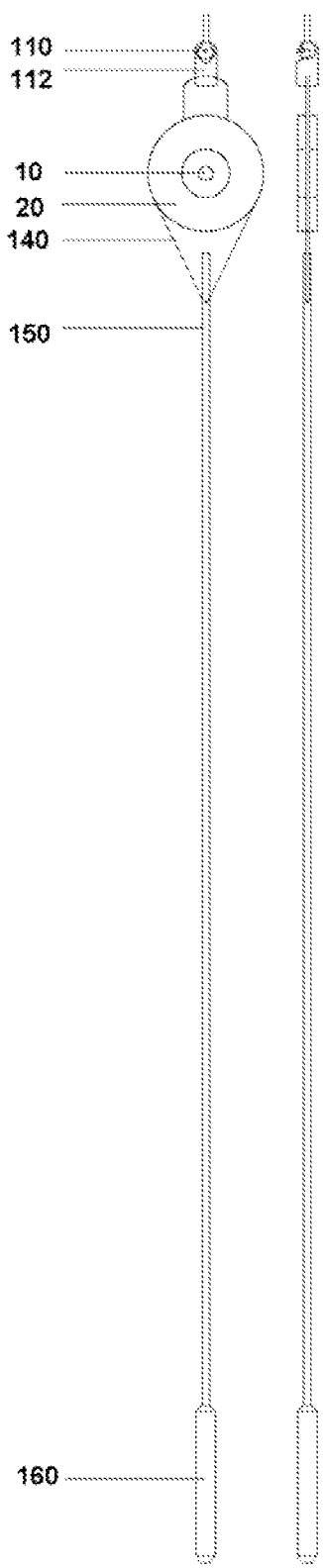
FIG. 11b displays a view of the target displayed in FIG. 11a, however the orientation of the ball and socket joint in relation to the target frame is inverted in this embodiment of the present invention
Figure 12:
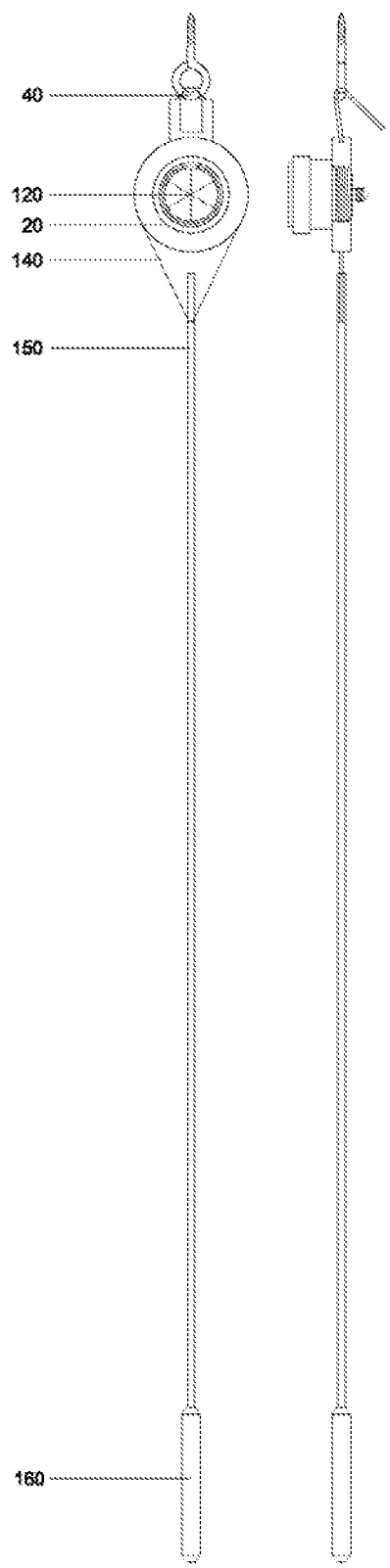
FIG. 12 shows a front and a side view of the target employing the hook and eye configuration to preferably be employed in the high target frame embodiment of the present invention, highlighting the connecting rod.
Figure 13:
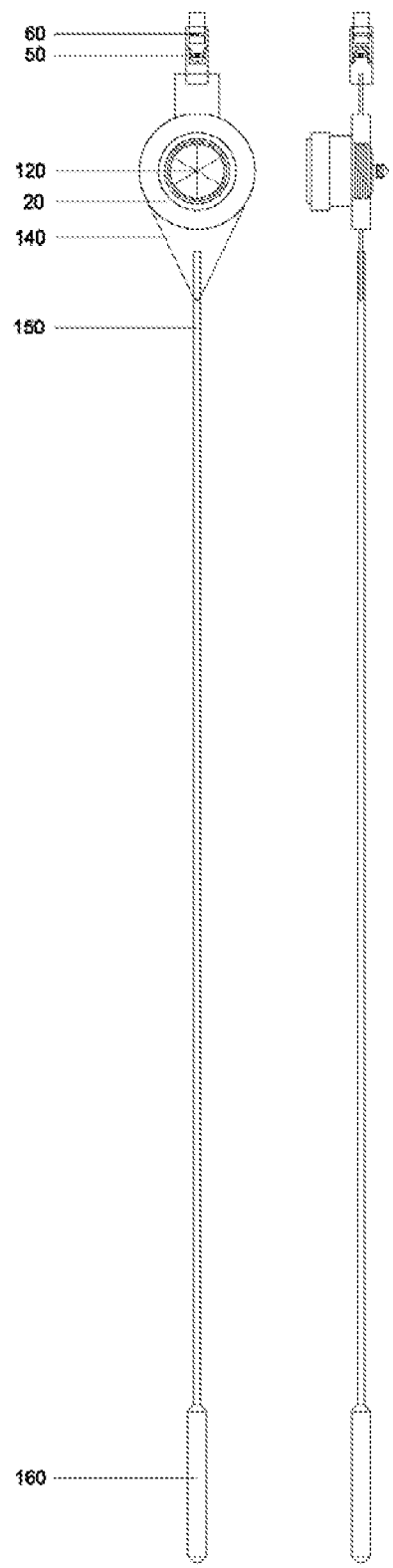
FIG. 13 shows a front and a side view of the target employing the universal joint configuration to be employed in the high target frame embodiment of the present invention, highlighting the connecting rod.
Figure 14A:
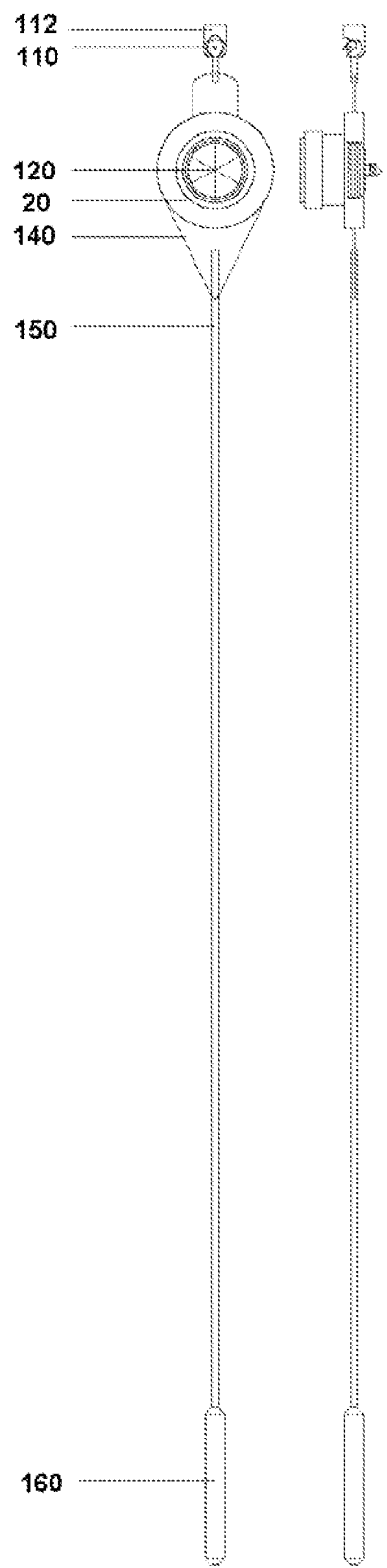
FIG. 14a displays a view of the target of an alternate embodiment of the present invention as seen from the front and the side, highlighting the ball and socket joint pivot point, an integrated stop to limit rotation on the horizontal plane, and target designed to be employed with the high target frame, highlighting the connecting rod.
Figure 14B:
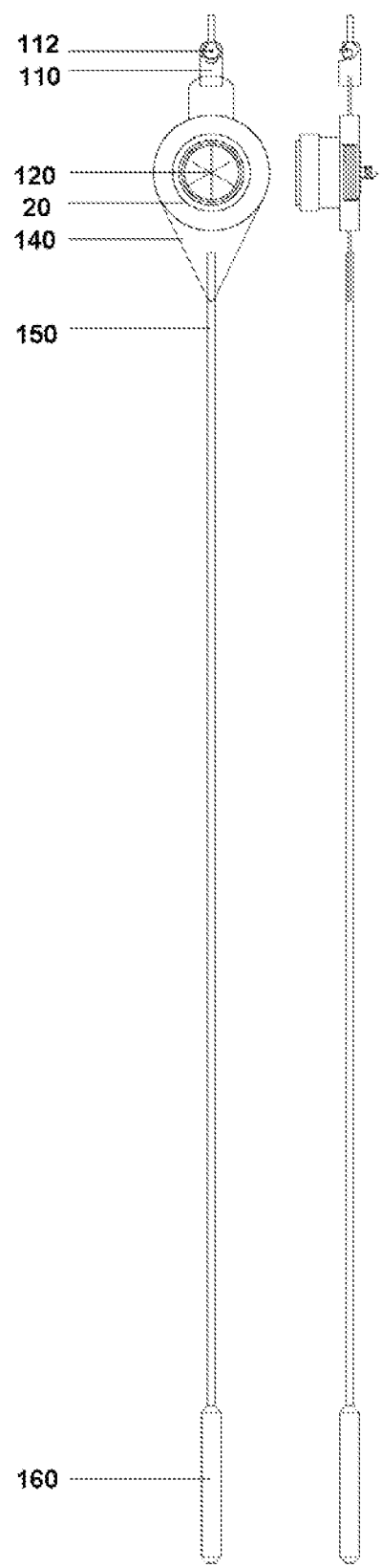
FIG. 14b displays a view of the target displayed in FIG. 14a, however the orientation of the ball and socket joint in relation to the target frame is inverted in this embodiment of the present invention.

The present invention preferably consists of a target (20), a target center (10), a target pointer (30), a target attachment device (60), a weighted target body (70), and a low target frame (180) or a high target frame (220). The target center (10) is centrally placed on the target (20) and typically includes a retro-reflective surface designed to reflect light back to the Total Station. The target (20) is preferably affixed to the low target frame (180) or the high target frame (220) via the target attachment device (60). Additionally, the target (20) in each embodiment of the present invention is preferably weighted. The weighted target body (70) is preferably only employed by the alternate embodiments of the present invention that are outlined in FIG. 3 in combination with the low target frame (180), as well as in FIG. 10 shown in combination with the high target frame (220). The high target frame (220) is preferably designed to be employed in instances where obstacles may interfere with the placement of the low target frame (180), which is lower to the ground, and employs a handle (210) to facilitate movement of the present invention by the user.

The target attachment device (60) may employ a variety of conventional attachment means, which are outlined in FIGS. 1-7. These include, but are not limited to a ball and socket joint, consisting of a ball portion (110) and a socket portion (112), a dual axis mechanism (50), a hook and eye attachment (40), and a fore and aft pivot point (90) operating in conjunction with a side-to-side pivot point (100). The ball portion (110) and the socket portion (112) of the ball and socket joint employed in one embodiment of the present invention allows for the self-plumbing of the target (10) in a spherical orientation while limiting rotation in the horizontal plane. Each of the above attachment means are preferably attached to the target attachment device (60) such that the target (20) may be easily removed for storage. For most embodiments of the present invention, the target attachment device (60) employs a square fitting that contains a spring-loaded ball detent mechanism, facilitating placement and removal of the target (20) of the present invention by the user. It should be understood that only one means of attachment of the target (20) via the target attachment device (60) is employed per embodiment of the present invention. Similarly, each of the above conventional attachment means may be configured to function with the high target frame (220), as seen in FIGS. 8-14.

Additionally, it should be understood that while each of these means of attachment are known to be conventional, each would vary slightly in terms of cost of construction of the present invention; therefore, multiple embodiments of the present invention are envisioned to cover an assortment of pricing options to facilitate widespread use of the present invention. It is envisioned that each means of attachment is effectively capable of placing the target (20) in a plumb state quickly and easily via the force of gravity.

Figure 15:
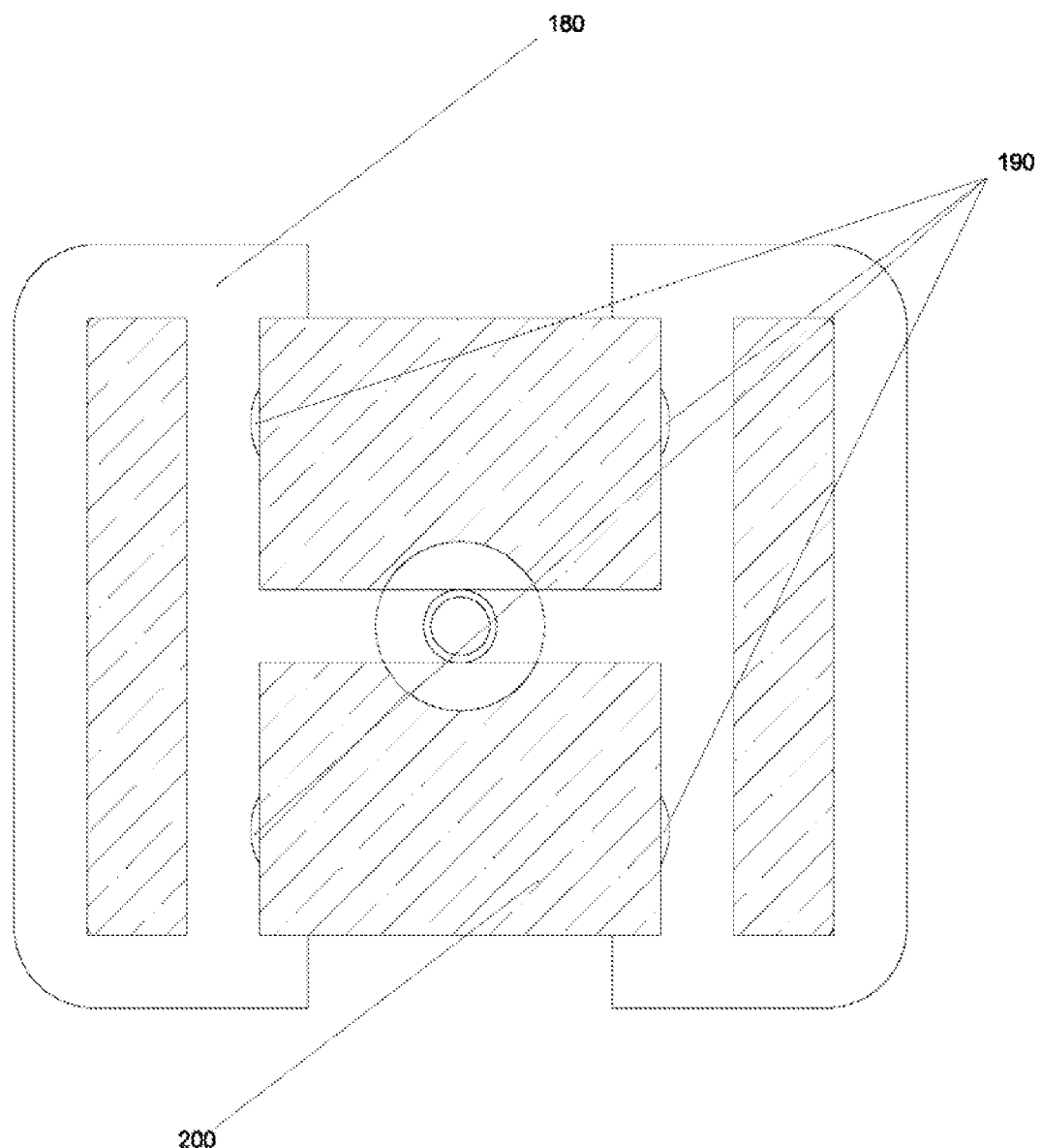
FIG. 15 exhibits a view of an alternate embodiment of the present invention displaying the low target frame as viewed from the top.
Figure 16:
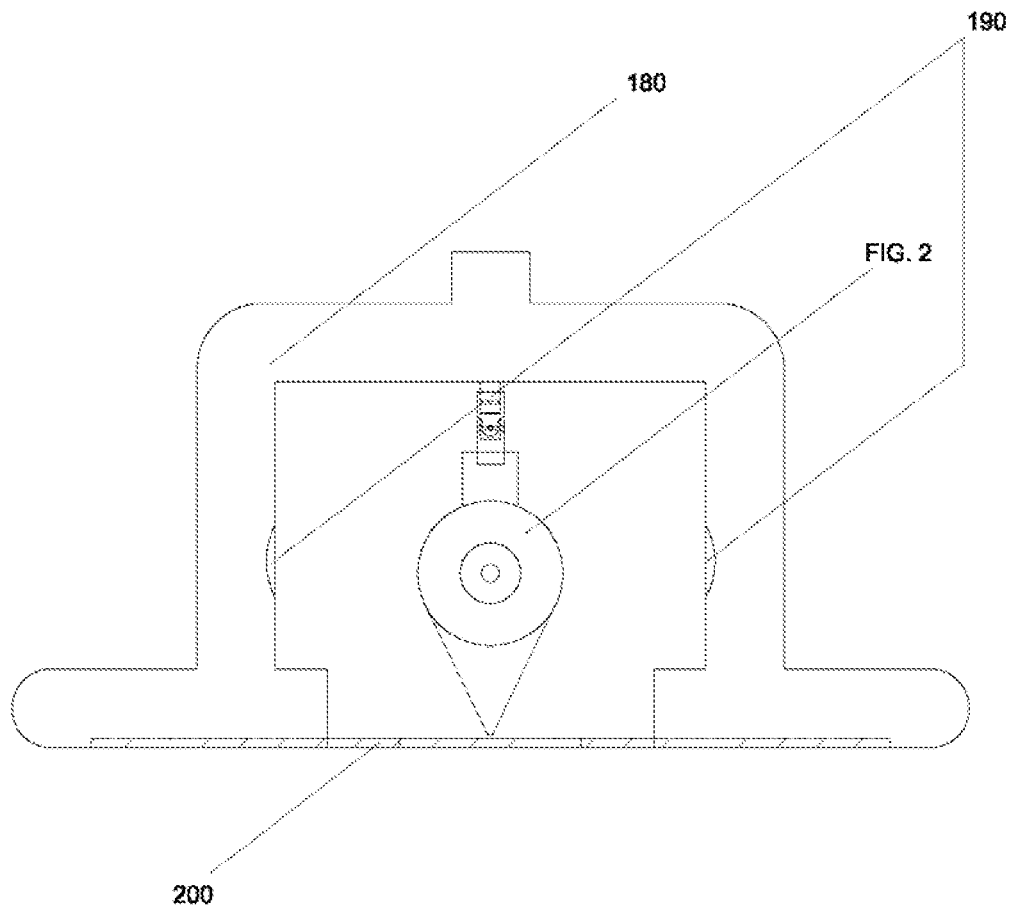
FIG. 16 displays the low target frame of the present invention, along with the low height target embodiment as viewed from the front.
Figure 17:
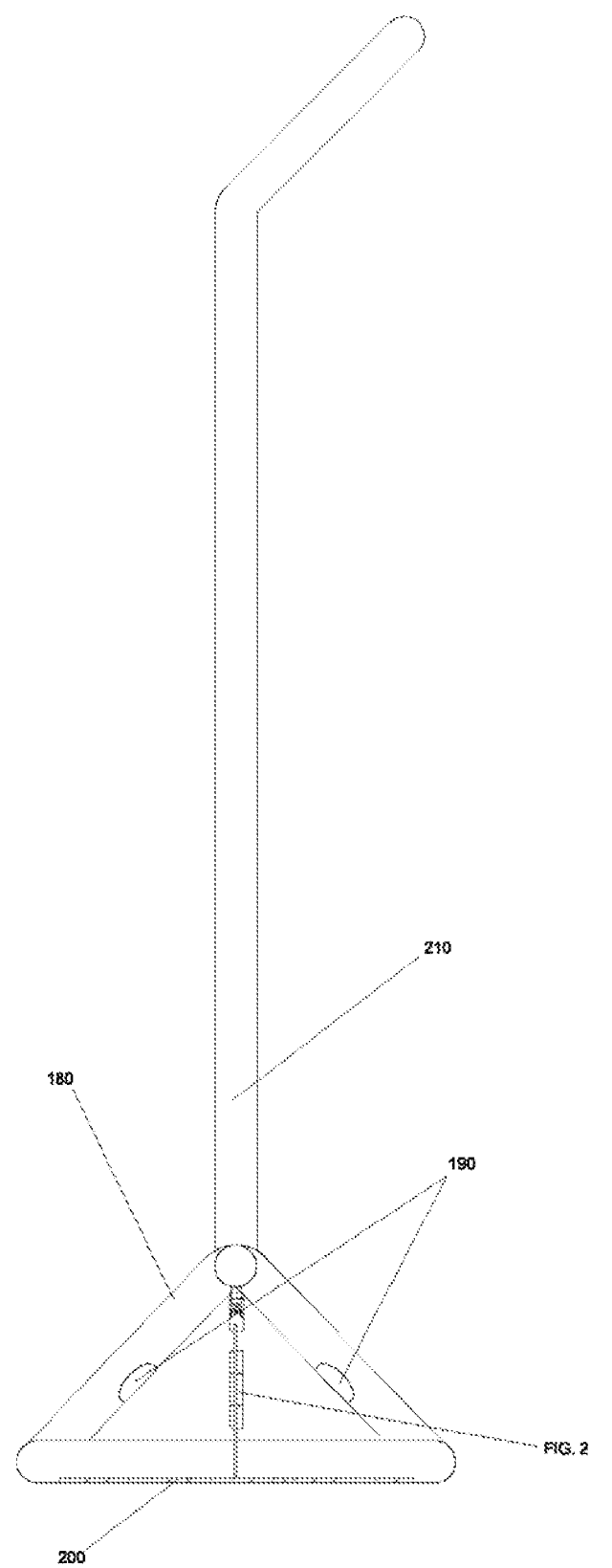
FIG. 17 displays the low height target frame of the present invention including the handle as viewed from the side.
Figure 18:
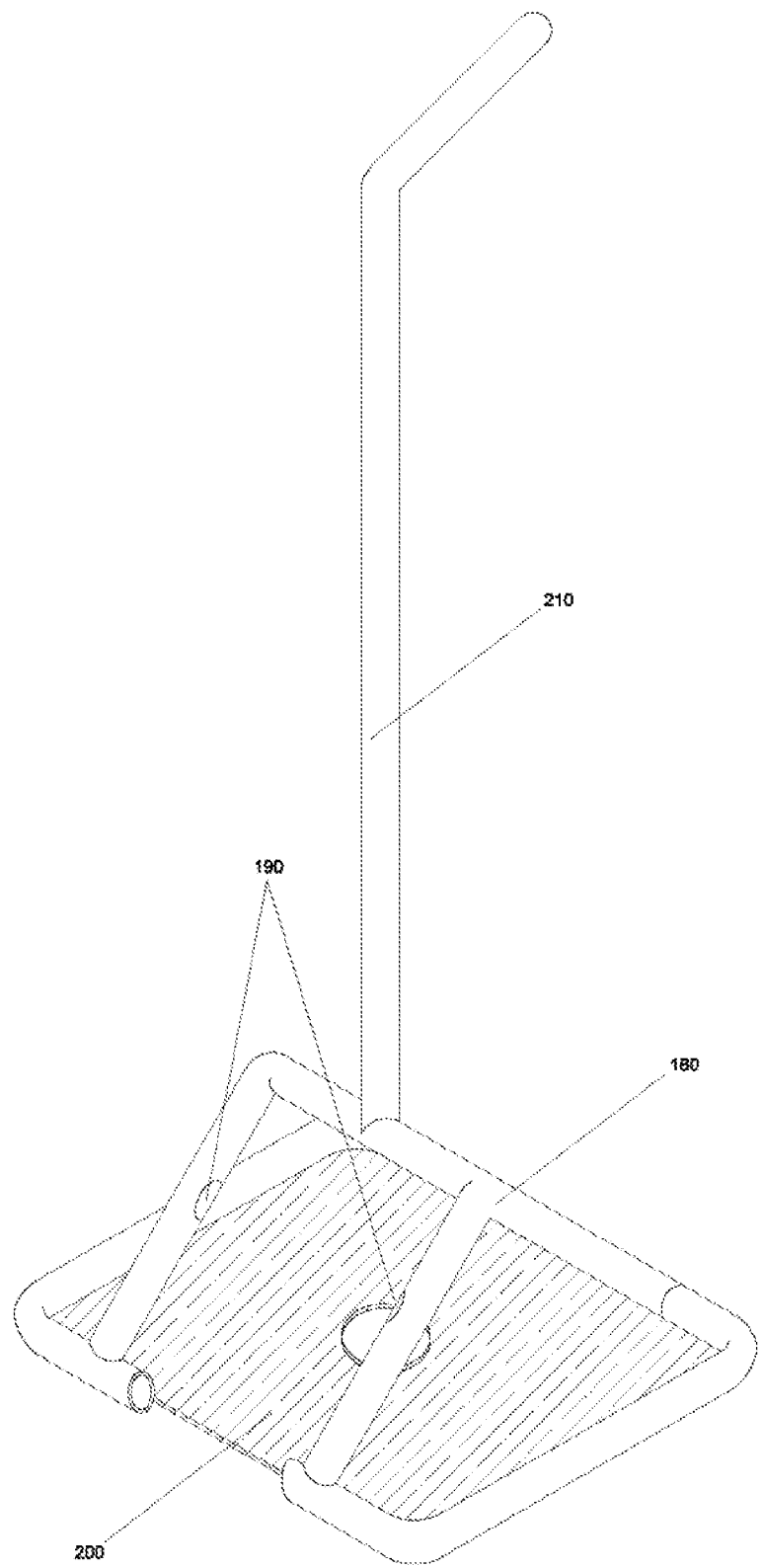
FIG. 18 exhibits an angled or environmental view of the low height target frame present invention including the handle.
Figure 19:
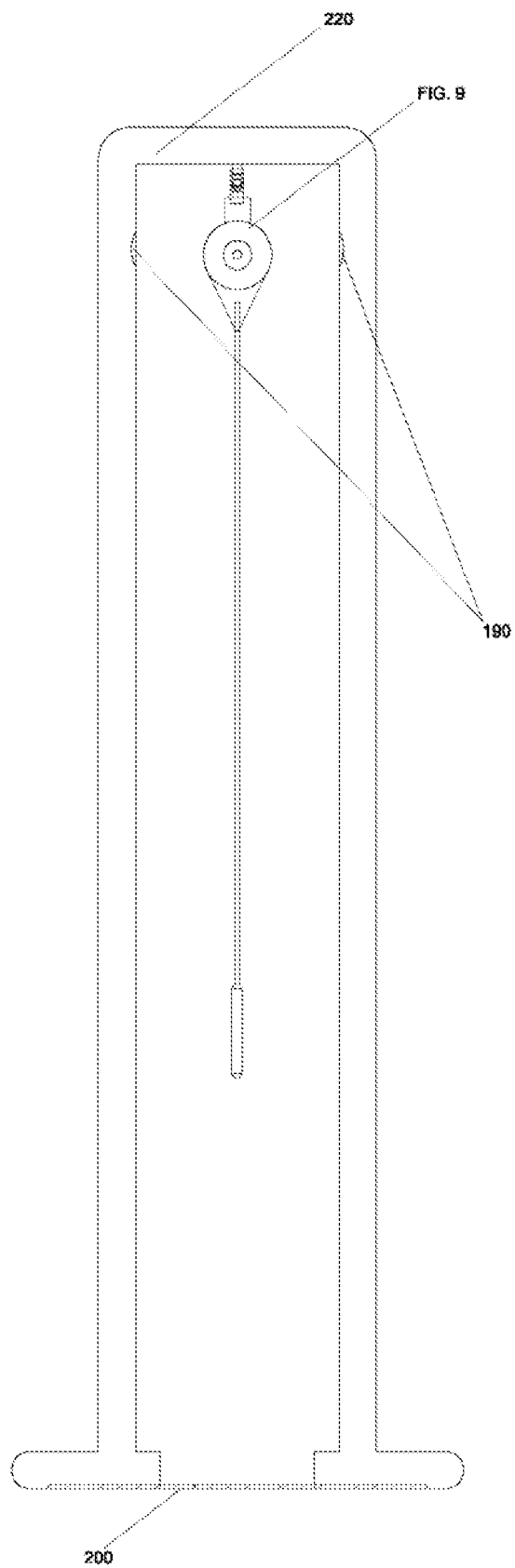
FIG. 19 shows the present invention assembled, employing the high target frame as viewed from the front.
Figure 20:
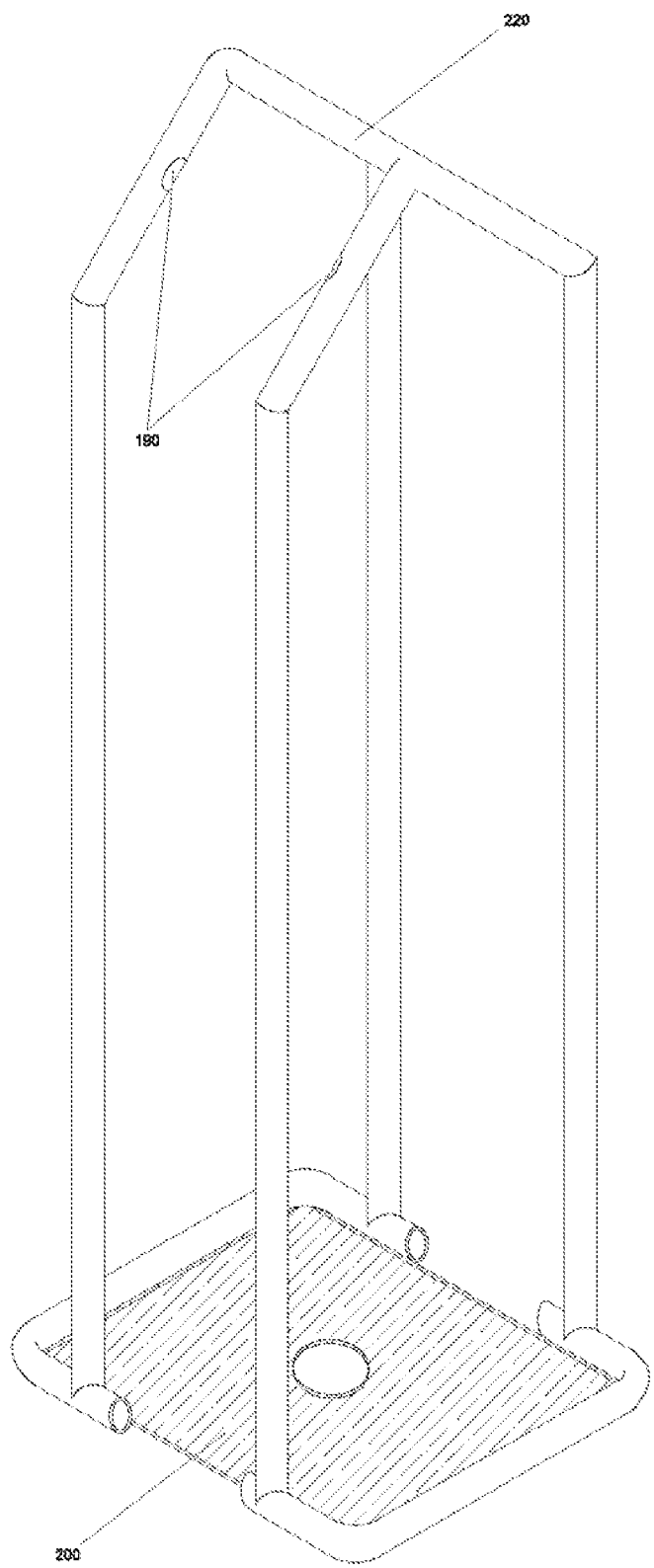
FIG. 20 shows an angled or environmental view of the high target frame of the present invention.
Figure 21:
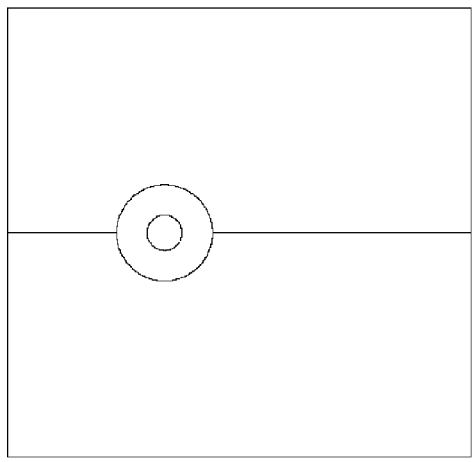
FIG. 21 details an alternate embodiment of the present invention in which the retro-reflective focal point is integrated into a hollow rectangular frame.
Figure 21:
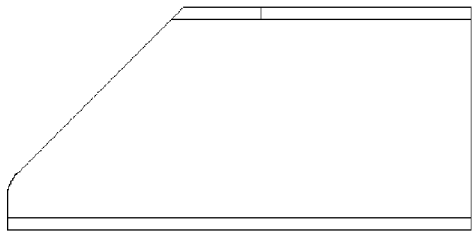
Figure 21:
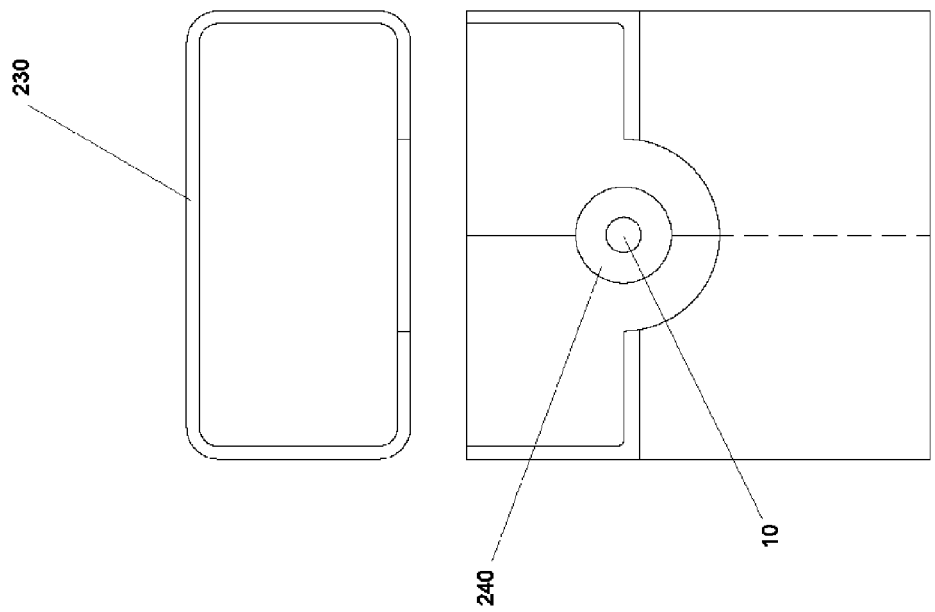

Both the high target frame (220) and the low target frame (180) are preferably equipped with an internal lighting system (190) designed to cast illumination onto the target (20) for low ambient light applications. The internal lighting system (190) preferably employs at least one LED bulb to illuminate the target (20). It is envisioned that the internal lighting system (190) may employ a reflective surface to direct the light towards the target (20), and a clear bulb cover to protect the internal lighting system (190) from water or debris. The internal lighting system (190) is ideally incorporated into the sides of the high target frame (220) and low target frame (180) in the preferred embodiments of the present invention, as seen in FIG. 15 and FIG. 19. The preferred embodiment of the present invention employs four LED bulbs, each oriented to cast light towards the target (20). Basic forms of the present invention may not include the internal lighting system (190), in order to save on costs to the consumer; however, it is preferred that the internal lighting system (190) is included in the present invention.

The internal lighting system (190) is preferably powered via an internal power source, such as a battery or a conventional rechargeable battery charged via a solar panel. Additionally, the high target frame (220) and the low target frame (180) of the present invention are preferably equipped with a floor plate (200), as seen in FIG. 15-20, to allow the target (20) to be placed in areas where natural conditions would adversely affect the free movement of the pendulum target, such as brush or grassy surfaces. The floor plate (200) is designed to aide the stability of the present invention, ensuring the present invention does not easily topple over.

The present invention may be outfitted with a variety of pivot points, each capable of employing the force of gravity to quickly and accurately plumb the target (20). The alternate pivot point detailed in FIG. 2 enables the target (20) to seek a plumb state by pivoting on a dual axis mechanism (e.g. universal joint). Additionally, some embodiments of the present invention are preferably outfitted with a retro-reflective corner cube known as a trihedral reflector (120). The trihedral reflector (120) is preferably employed in conjunction with a counter weight (130) which is used to ensure that the reflective face of the trihedral reflector (120) is perpendicularly balanced when the present invention is in use. The trihedral reflector (120), when employed in alternate embodiments of the present invention, is envisioned to be located at the target center (10), and to face the visible red laser or infrared laser of the emitter of the Total Station. It is similarly envisioned that the present invention could be configured to work with other conventional reflectors with minimal adaptation.

Figure 1:
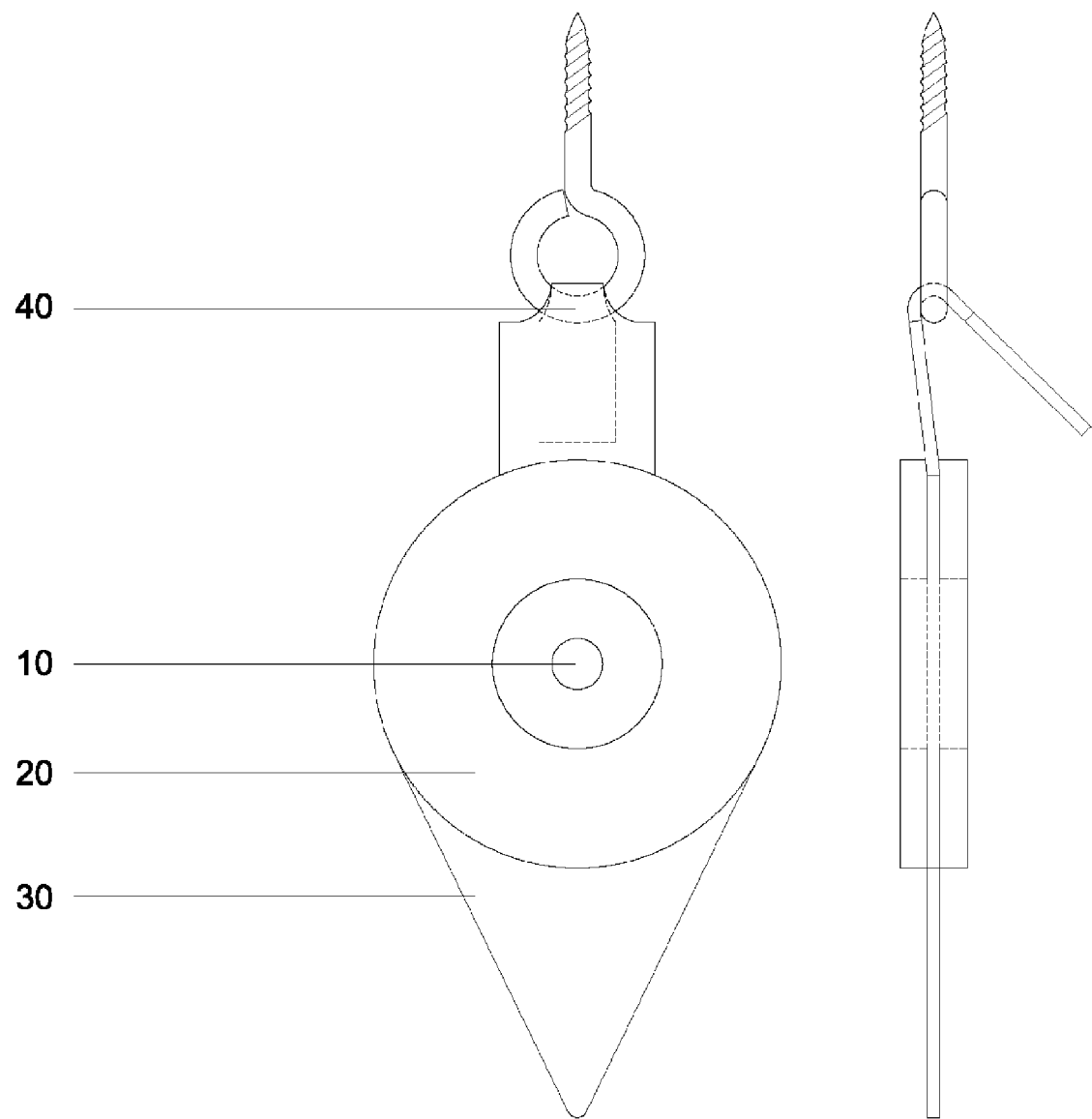
FIG. 1 displays a front and side view of the target of the preferred embodiment of the present invention displaying the preferred pivot point of a circular eye integrated into the low target frame.
Figure 2:
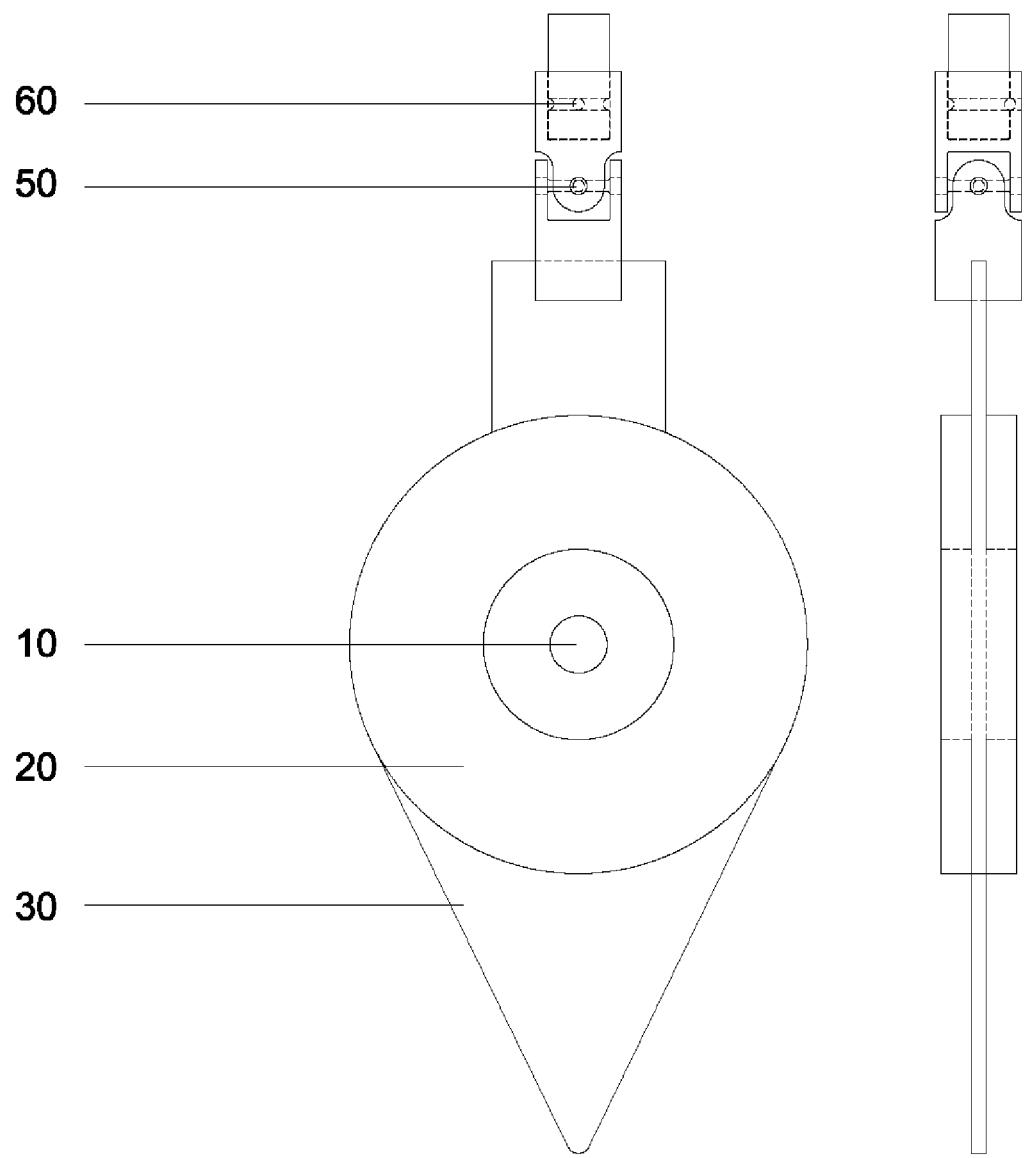
FIG. 2 exhibits a front and side view of the target of an alternate embodiment of the present invention as seen from the front and side, displaying the universal joint pivot point and target preferably designed to be employed with the low target frame.
Figure 3:
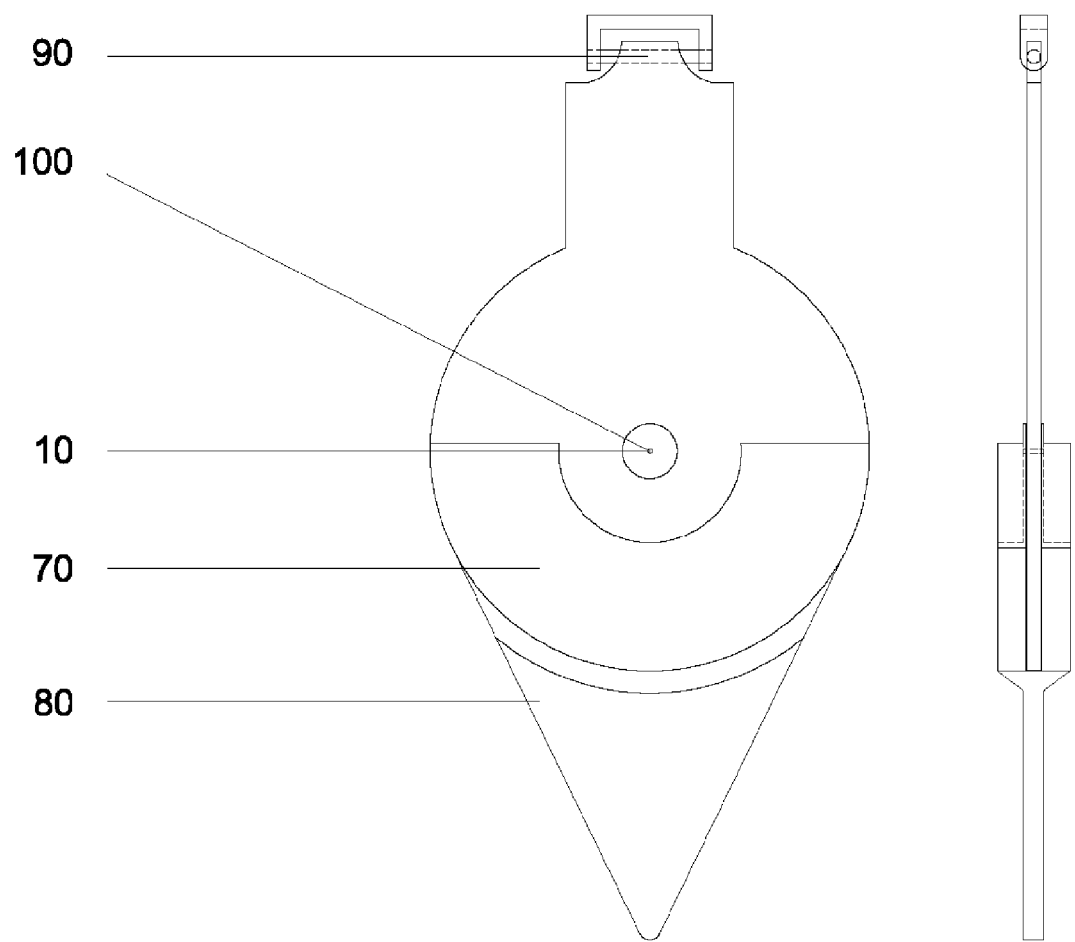
FIG. 3 shows a view of the target of an alternate embodiment of the present invention as seen from the front and side, displaying the dual axial pivot point and target preferably designed to be employed with the low target frame.

Another alternate embodiment of the present invention includes a third alternate pivot point as detailed in FIG. 3, whereby the target (20) seeks a plumb state by pivoting on two separate perpendicular axes. In this embodiment, the target assembly pivots fore and aft on the top axis (90). The lower portion of the target (20), including a weighted target body (70) and a pointer (80), pivots side to side about a central axis (100) which is central to the target center (10).

Figure 4A:
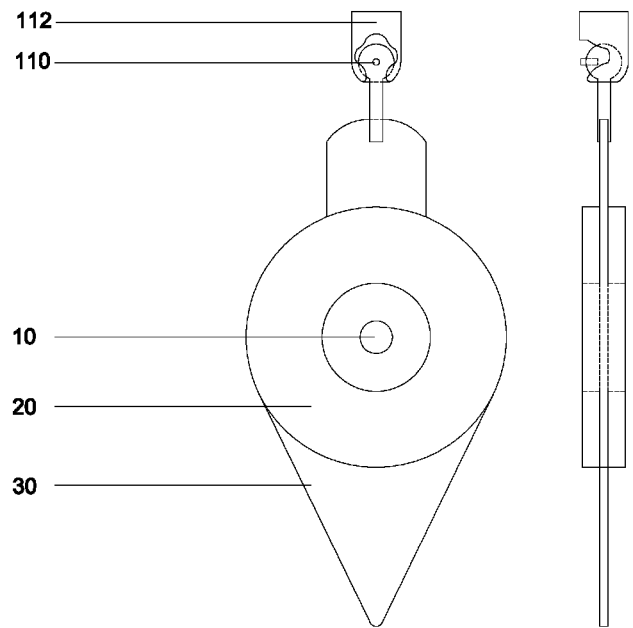
FIG. 4a displays a view of the target of an alternate embodiment of the present invention as seen from the front and side, highlighting the ball and socket joint pivot point, an integrated stop to limit rotation on the horizontal plane and target preferably designed to be employed with the low target frame.
Figure 4B:
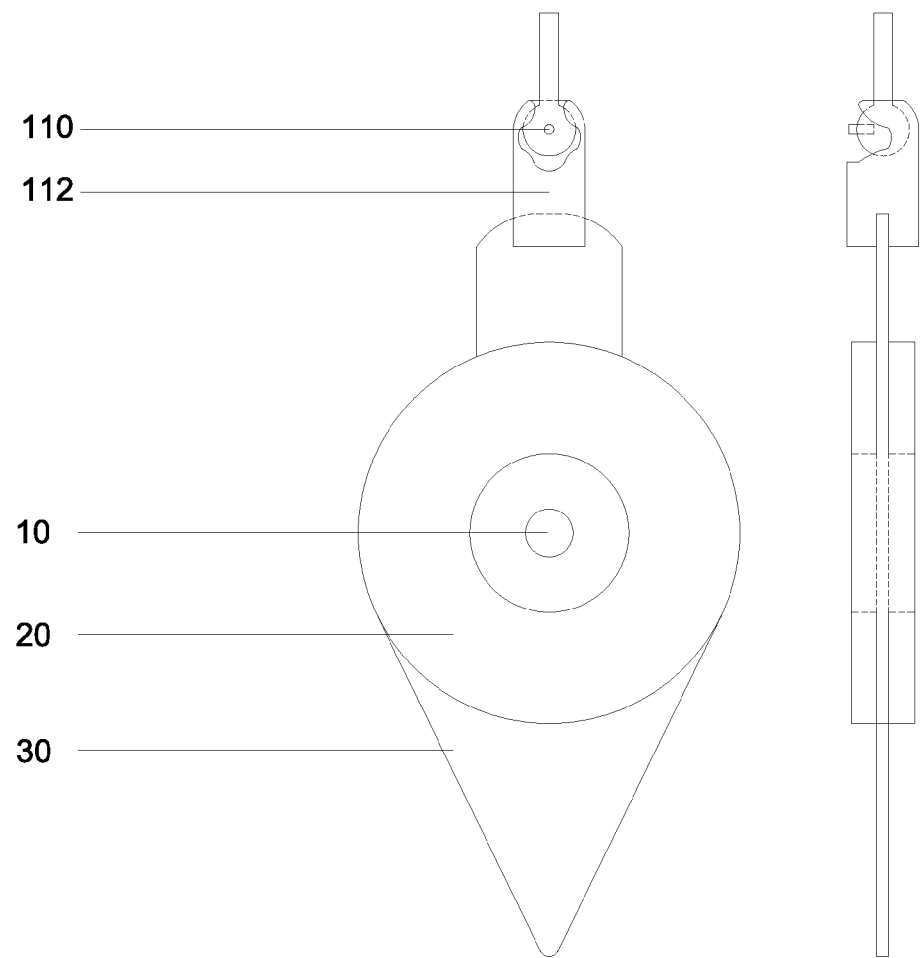
FIG. 4b displays a view of the target displayed in FIG. 4a, however the orientation of the ball and socket joint in relation to the target frame is inverted in this embodiment of the present invention

A fourth alternate embodiment of the present invention, as shown in FIG. 4, exhibits a fourth alternate pivot point, whereby the target seeks a plumb state by pivoting on a conventional ball and socket joint.

Figure 5:
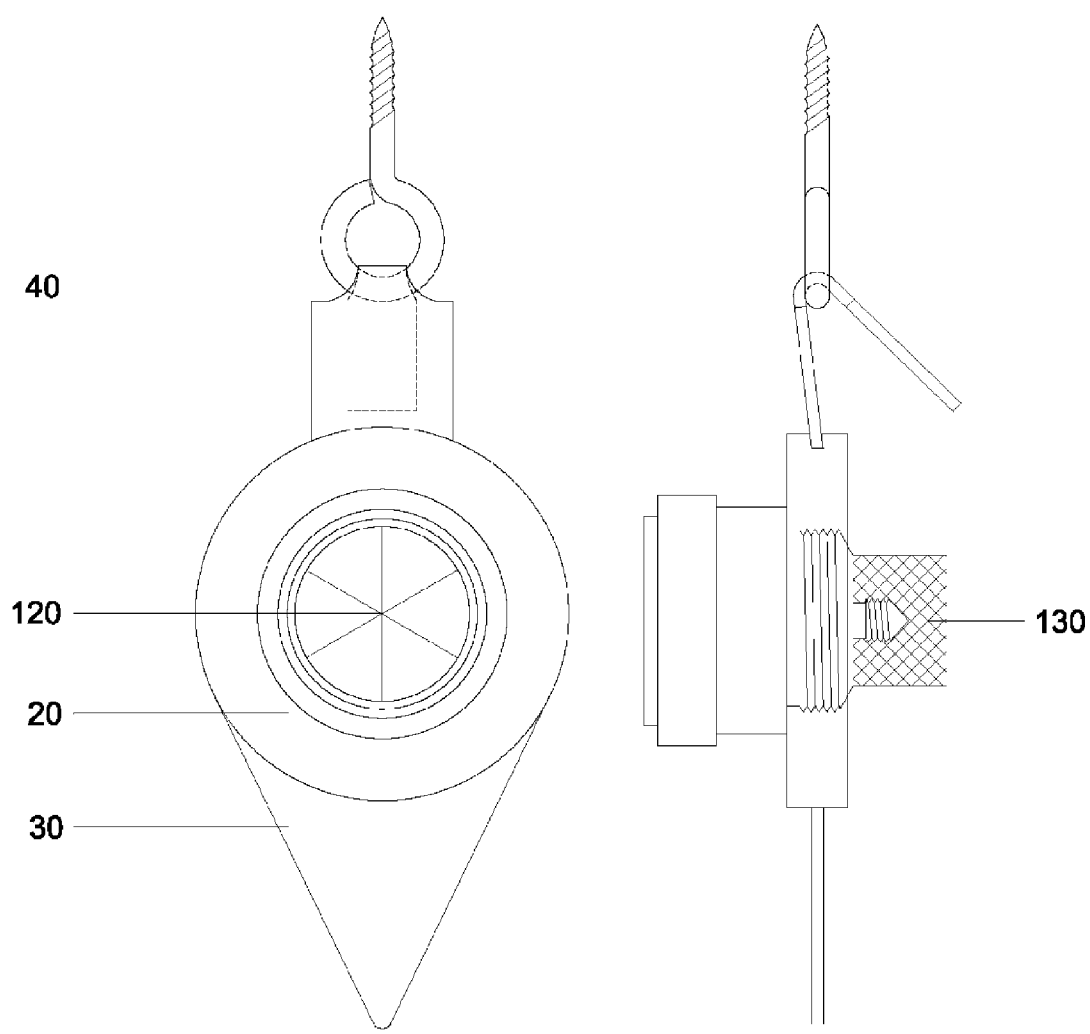
FIG. 5 shows a view from the front and side of the target of the currently preferred embodiment of present invention, displaying the preferred pivot point of a hook integrated into the low target frame and highlighting the counterweight on the target.
Figure 6:
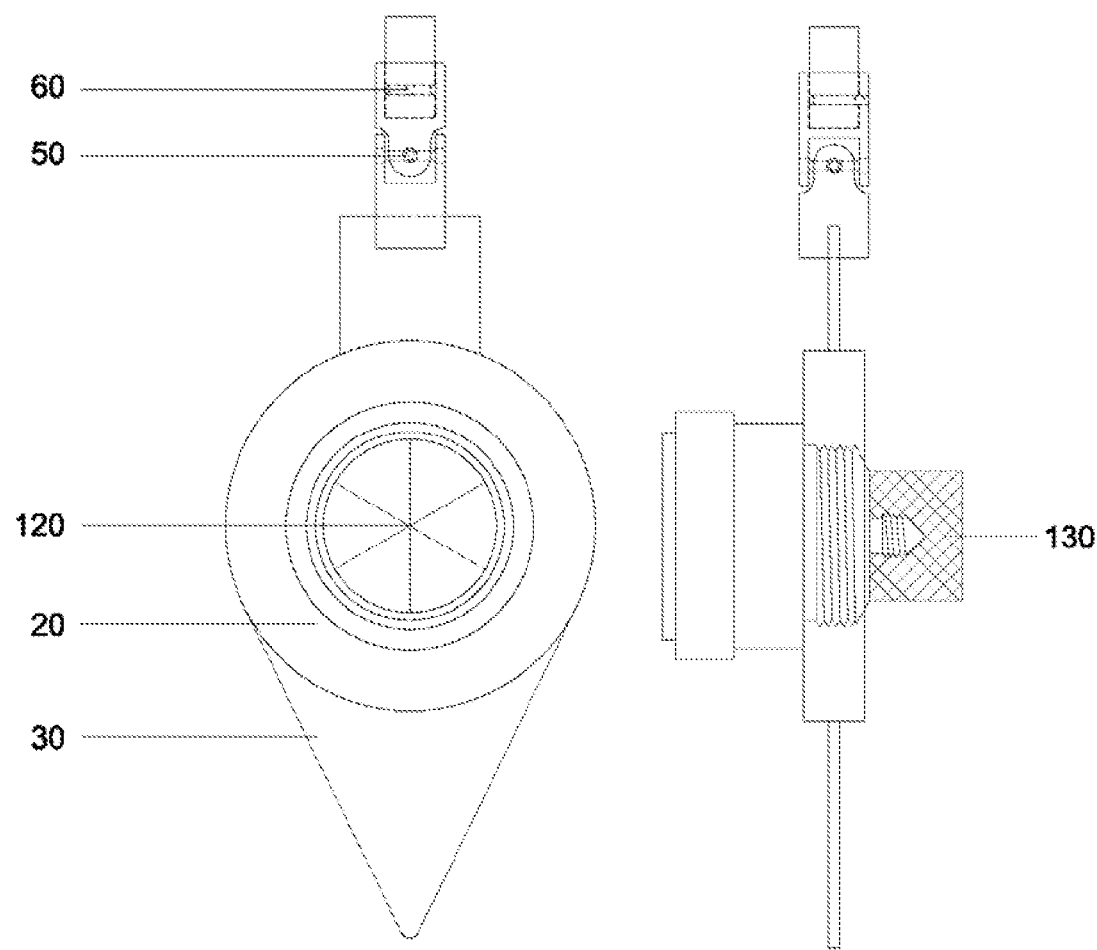
FIG. 6 exhibits a view of the target of an alternate embodiment of the present invention as seen from the front and the side, displaying the universal joint pivot point and target preferably designed to be employed with the low target frame, as well as highlighting the counterweight on the target.
Figure 7A:
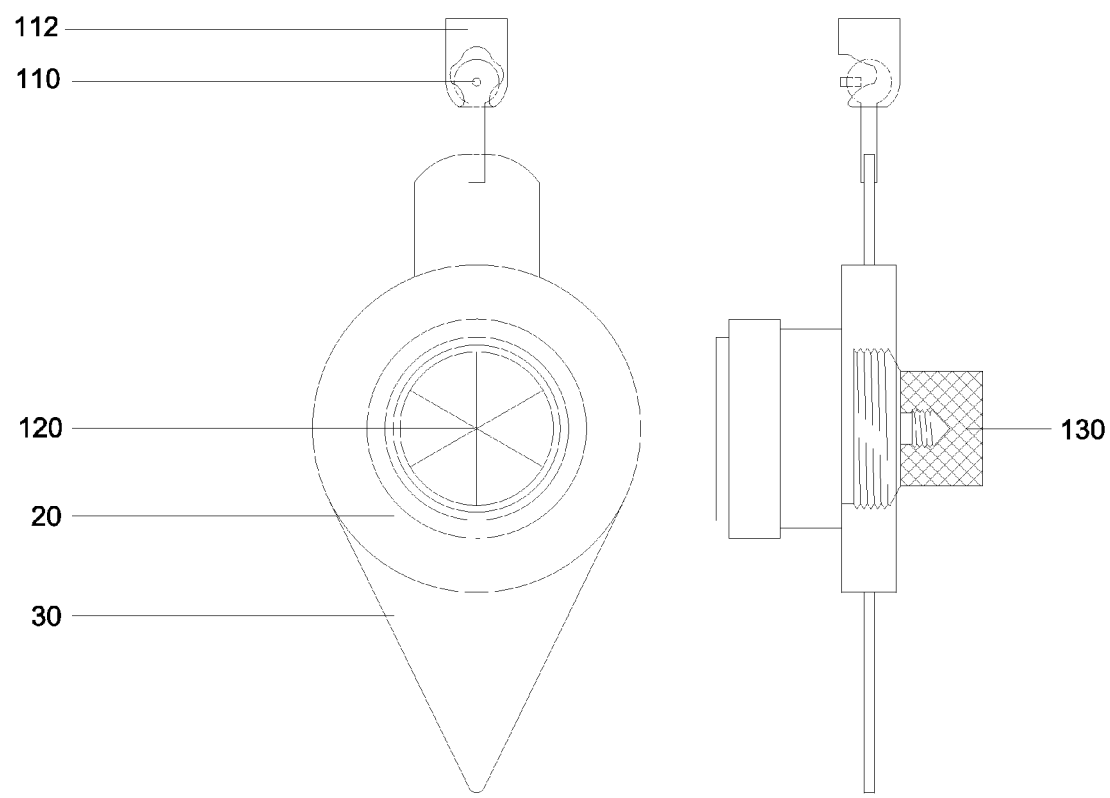
FIG. 7a displays a view of the target of an alternate embodiment of the present invention as seen from the front and the side, highlighting the ball and socket joint pivot point, an integrated stop to limit rotation on the horizontal plane, target, and counterweight preferably designed to be employed with the low target frame.
Figure 7B:
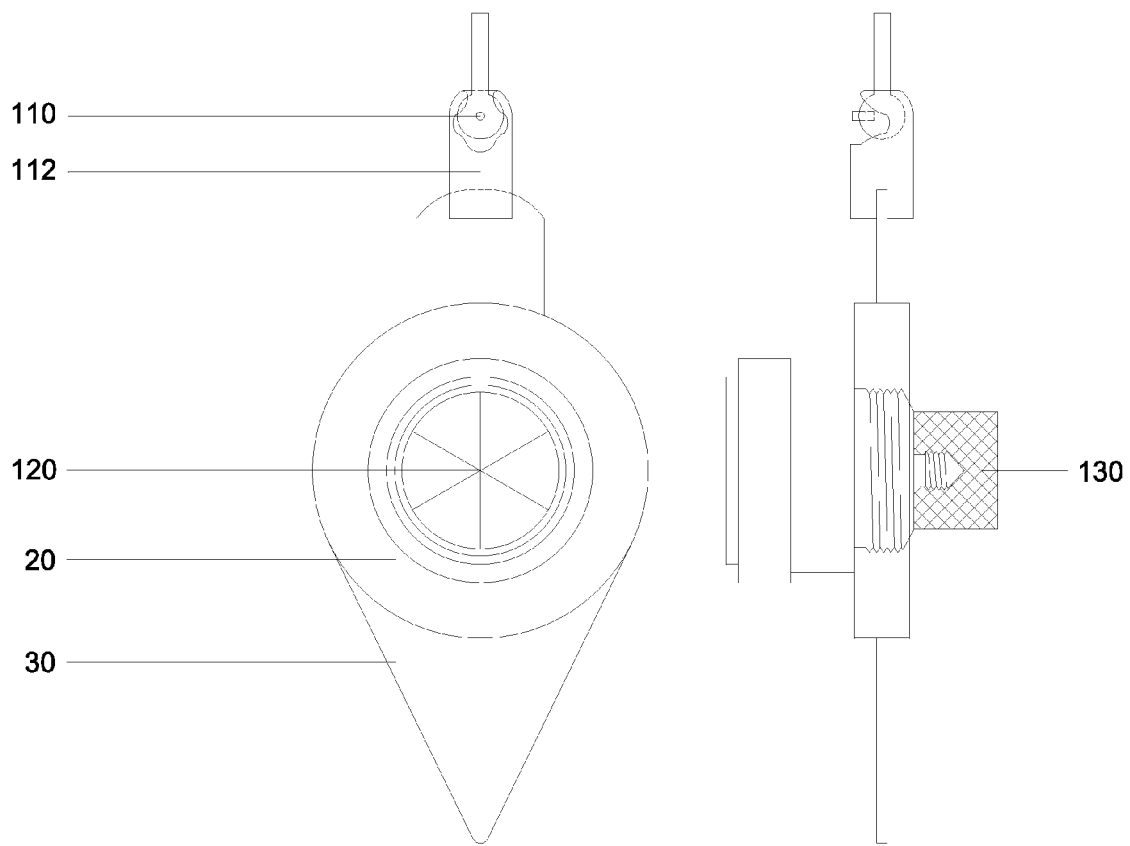
FIG. 7b displays a view of the target displayed in FIG. 7a, however the orientation of the ball and socket joint in relation to the target frame is inverted in this embodiment of the present invention
Figure 8:
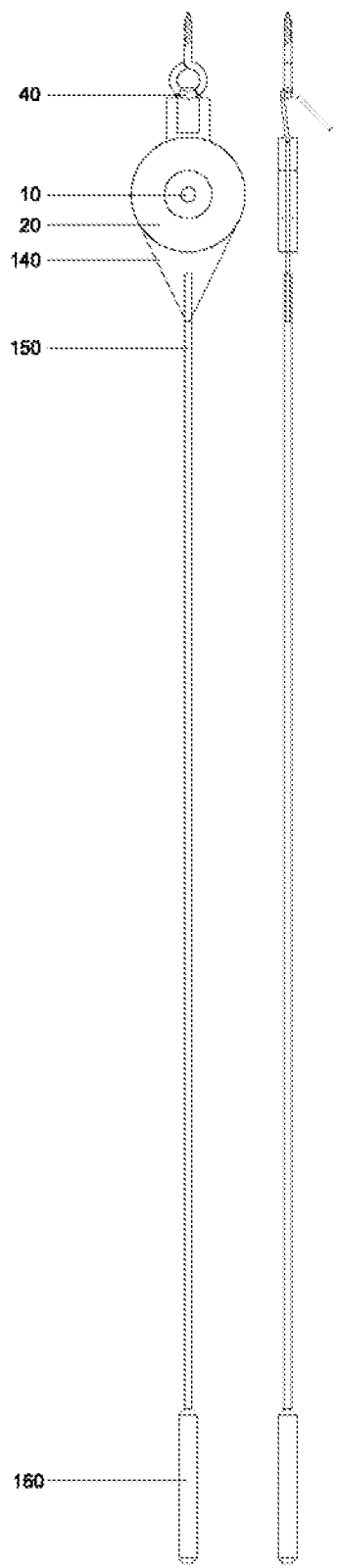
FIG. 8 shows a front and a side view of the target employing the hook and eye configuration to preferably be employed in the high target frame embodiment of the present invention, highlighting the connecting rod linking the target body to the laser plummet.
Figure 9:
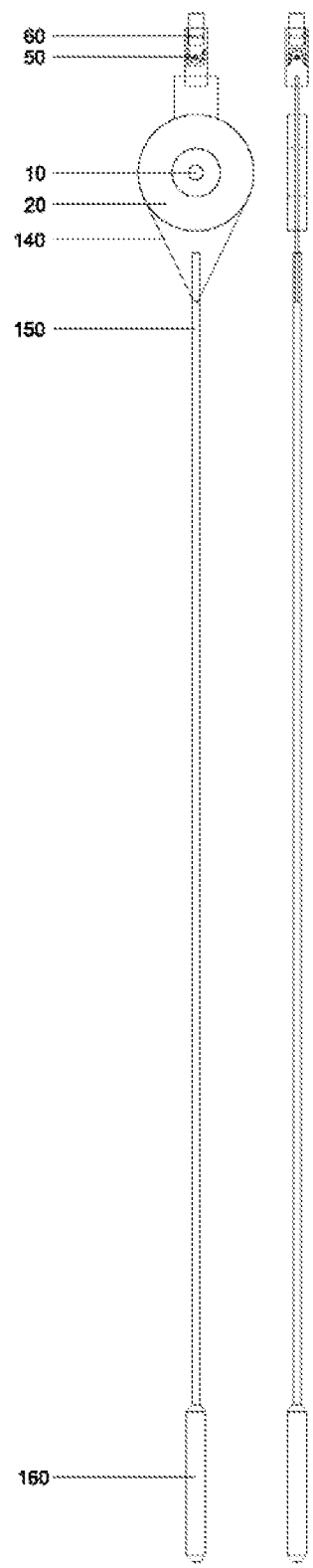
FIG. 9 shows a front and a side view of the target employing the universal joint configuration to be employed in the high target frame embodiment of the present invention, highlighting the connecting rod linking the target body to the laser plummet.

A fifth alternate embodiment of the present invention, as shown in FIG. 5, employs a fifth alternate pivot point, a hook and eye attachment (40), whereby the target seeks a plumb state by pivoting fore and aft on a hook integrated into the target (20), and side to side on a circular eye. The target (20) preferably includes a retro-reflective corner cube trihedral reflector (120) with a counter weight (130) to ensure that the face of the trihedral reflector (120) is perpendicular to plumb. In general, the use of the trihedral reflector (120) necessitates the use of the counterweight (130).

The present invention is preferably available in at least two sizes: a low target frame (180) that is low to the ground and preferably equipped with a handle (210) that extends upwards, and a high target frame (220) that is designed to be used in areas where grass or other obstacles could interfere with the reading of the Total Station. The high target frame (220) is designed to receive the target (20) configured with a laser plummet (160).

The laser plummet (160) is designed to vertically align the target (20) with the entity to be measured by positioning it using a downward focused laser. A connecting rod (150) is suspended from the target (20) linking the target (20) to the laser plummet (160). The target (20), while already weighted as a standard across all embodiments of the target (20) may be further weighted with a weighted target body (70) which is designed to aide the stabilization of the target (20) at windy locations, and to expedite the achievement of a plumb state for the target (20). When the high target frame (220) is employed with the target (20) equipped with a trihedral reflector (120), a counterweight (130), consisting of the connecting rod (150) and laser plummet (160), is preferably employed to ensure that the reflective face of the target center (10) perpendicularly balanced.

In both the low embodiment of the present invention employing the low target frame (180) and the high embodiment of the present invention employing the high target frame (220), the primary material employed for construction is preferably lightweight, such as plastic or acrylic. Conventional PVC piping may be employed for low-cost construction of all embodiments of the present invention, which may be sealed and/or glued together in assembled form, or left unsealed to facilitate easy storage of all components of the present invention. Similarly, lightweight wooden dowels could be employed to construct the low target frame (180) and/or the high target frame (220) as well.

It is envisioned that, while not disclosed in the figures, alternate embodiments of the present invention may be equipped with flexible joints to allow the present invention to be folded for storage while remaining fully assembled. Similarly, it should be understood that the present invention may be constructed of a lightweight metal while not venturing from the essence of the present invention. Likewise, the construction material used to construct the low target frame (180), high target frame (220) and target (20) may be one of a variety of colors or cosmetically altered from the embodiments shown in the figures while still accomplishing the function of the present invention.

It is envisioned that all components of the present invention are designed to fit within a specially designed case. Cases may be designed to hold both the low target frame (180) and the high target frame (220) securely for storage and transport. Cases for the present invention are preferably constructed of a durable, lightweight material, and may include cutouts for the various components of the present invention.

An additional embodiment of the present invention is envisioned where the cost to the consumer and speed of use are the dominate concerns. This embodiment consists of a small rectangular body (230) to which the target center (10) which is preferably retro-reflective, is affixed to the interior and exterior of the rectangular body (230). The rectangular body (230) of this embodiment of the present invention is designed to be free-standing, and is preferably hollow. A high visibility cue (240) is ideally located at the center of the rectangular body (230), and is preferably brightly colored to facilitate the location of the retro-reflective focal point. This embodiment is preferred for applications where absolute plumb, or internal lighting are not necessary. Multiple embodiments of the present invention could be deployed simultaneously, thereby greatly speeding up the mapping process.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

I claim:

1. A self-plumbing target for an electronic distance measuring instrument comprising:
    a target, said target is in a vertical orientation;
    wherein said target is weighted to expedite and maintain a position plumb with the ground;
    a pointer portion at a bottom of said target;
    a connecting rod, said connecting rod in communication with said target;
    a laser plummet, said laser plummet in communication with said connecting rod;
    a target holder framework;
    wherein said target holder framework prevents twisting oscillation of said target from wind;
    a ball and socket joint mechanism connecting said target pointer to said target holder framework;
    wherein said ball and socket joint mechanism has a ball portion and a socket portion;
    a pin, said pin disposed on said ball portion of said ball and socket joint mechanism;
    wherein said ball and socket joint mechanism is configured to limit rotation of the target in the horizontal plane about a vertical axis;
    wherein said target is suspended from said target holder framework above the ground about said ball and socket joint mechanism;
    wherein said pin is disposed perpendicular to said target;
    wherein said pin maintains said target within the same plane of said target holder framework; and
    wherein said socket portion is in direct communication with said pin as said ball portion rotates horizontally, preventing said ball portion from full rotation about the vertical axis.

2. The self-plumbing target for an electronic distance measuring instrument of claim 1, further comprising:
    a reflector;
    wherein said reflector is disposed on said target;
    a counterweight;
    wherein said counterweight is aligned with a center of said target; and
    wherein said counterweight is aligned horizontally with the reflector.

3. The self-plumbing target for an electronic distance measuring instrument of claim 2, wherein said counterweight establishes an equilibrium with the weight of said target to ensure said reflector remains perpendicularly balanced.

4. A method for accurately measuring points electronically comprising:
    assembling a target frame;
    suspending a target from a target attachment device disposed at a top of the target frame;
    wherein said target is weighted with a counter weight and a weight;
    wherein the target is equipped with a reflector disposed at a center of the target;
    wherein said target attachment device is a pivot point;
    aligning the reflector above an entity to be measured about a point of alignment;
    allowing the target to reach a plumb state via gravity;
    the reflector extending behind the point of alignment;
    the counter weight of the target maintaining a static position of the target;
    activating an internal lighting system of the target frame;
    the internal lighting system illuminating the target;
    orienting a total station within sight of the target;
    leveling the total station;
    directing a laser of the total station at the reflector; and
    measuring the distance between the total station and the target.

\* \* \* \* \*